US012803491B2

(12) United States Patent
Gollnick et al.

(10) Patent No.: US 12,803,491 B2
(45) Date of Patent: Nov. 17, 2026

(54) CONTROLLING THE OPERATION OF A POWER PLANT

(71) Applicant: Siemens Gamesa Renewable Energy A/S, Brande (DK)

(72) Inventors: Bert Gollnick, Hamburg (DE); Malik Ali Zaib Khokhar, Aalborg (DK); Xavier Vives Jaume, Brande (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 487 days.

(21) Appl. No.: 18/278,808

(22) PCT Filed: Feb. 23, 2022

(86) PCT No.: PCT/EP2022/054504
§ 371 (c)(1),
(2) Date: Aug. 24, 2023

(87) PCT Pub. No.: WO2022/184519
PCT Pub. Date: Sep. 9, 2022

(65) Prior Publication Data

US 2024/0133363 A1 Apr. 25, 2024
US 2024/0229768 A9 Jul. 11, 2024

(30) Foreign Application Priority Data

Mar. 1, 2021 (EP) .................................... 21159947

(51) Int. Cl.
*H02S 10/12* (2014.01)
*F03D 7/04* (2006.01)
(Continued)

(52) U.S. Cl.
CPC .............. *H02S 10/12* (2014.12); *F03D 7/042* (2013.01); *H02J 13/13* (2026.01); *H02S 10/20* (2014.12);
(Continued)

(58) Field of Classification Search
CPC .......... H02S 10/12; H02S 10/20; F03D 7/042; F03D 9/007; F03D 9/11; F03D 9/19;
(Continued)

(56) References Cited

U.S. PATENT DOCUMENTS 7,356,548 B1 * 4/2008 Culp .................. H04L 41/0816
9,610,444 B2 * 4/2017 Bharmi ................. A61B 5/486
(Continued)

FOREIGN PATENT DOCUMENTS

WO 2019214785 A1 11/2019

OTHER PUBLICATIONS

PCT International Search Report and Written Opinion of International Searching Authority mailed May 25, 2022 corresponding to PCT International Application No. PCT/EP2022/054504 filed Feb. 23, 2022.

*Primary Examiner* — Ziaul Karim
(74) *Attorney, Agent, or Firm* — Schmeiser Olsen PLLC

(57) ABSTRACT

A method of controlling the operation of a power plant is provided. The power plant includes plural energy systems, the plural energy systems including plural renewable energy generating systems, wherein the plural energy systems are coupled to a power grid. The method includes obtaining operating data of at least the renewable energy generating systems, the operating data being at least indicative of a lifetime consumption of the renewable energy generating systems; obtaining estimated environmental data that estimates one or more future environmental conditions; and modeling at least one of residual lifetime, energy production, or power demand satisfaction for a power demand for the energy systems. The modeling is based on the obtained operating data and is performed for a future period of time.
(Continued)

The modeling considers a modification of operating modes. Based on the modeling, the operation of the power plant is adjusted.

15 Claims, 4 Drawing Sheets

(51) Int. Cl.

| | |
|---|---|
| ***H02J 13/13*** | (2026.01) |
| ***H02J 101/24*** | (2026.01) |
| ***H02J 101/28*** | (2026.01) |
| ***H02S 10/20*** | (2014.01) |

(52) U.S. Cl.
CPC ....... *F05B 2220/30* (2013.01); *H02J 2101/24* (2026.01); *H02J 2101/28* (2026.01); *Y02E 10/00* (2013.01)

(58) Field of Classification Search
CPC .. F03D 7/0292; F03D 7/048; H02J 13/00006; H02J 2300/24; H02J 2300/28; F05B 2220/30; F05B 2260/821; F05B 2260/84; F05B 2270/332; Y02E 10/00
See application file for complete search history.

(56) References Cited

U.S. PATENT DOCUMENTS

| | | | | |
|---|---|---|---|---|
| 10,447,070 | B2 * | 10/2019 | Qin | H02J 7/35 |
| 2008/0046387 | A1 * | 2/2008 | Gopal | G01D 4/004 705/412 |
| 2008/0171979 | A1 * | 7/2008 | Brown | A61F 2/958 604/103.04 |
| 2009/0012917 | A1 * | 1/2009 | Thompson | G06Q 50/06 700/297 |
| 2011/0100005 | A1 * | 5/2011 | Sampson | H02S 10/10 60/645 |
| 2013/0161949 | A1 * | 6/2013 | Egedal | F03D 9/257 290/44 |
| 2013/0184884 | A1 * | 7/2013 | More | F03D 9/12 290/44 |
| 2013/0245847 | A1 * | 9/2013 | Steven | G06Q 50/06 700/291 |
| 2013/0346139 | A1 * | 12/2013 | Steven | G06Q 10/00 705/7.24 |
| 2014/0120961 | A1 * | 5/2014 | Buck | G06F 1/329 455/466 |
| 2015/0112497 | A1 * | 4/2015 | Steven | G06F 30/20 700/291 |
| 2017/0147025 | A1 * | 5/2017 | Darden, II | G05B 15/02 |
| 2017/0329319 | A1 * | 11/2017 | Kopp | F24F 11/30 |
| 2017/0338659 | A1 * | 11/2017 | Bhowmik | H02J 3/381 |
| 2018/0143037 | A1 * | 5/2018 | Kamel | G01D 4/002 |
| 2018/0171979 | A1 * | 6/2018 | Spruce | F03D 7/0292 |
| 2018/0173215 | A1 * | 6/2018 | Spruce | F03D 7/0292 |

* cited by examiner

CONTROLLING THE OPERATION OF A POWER PLANT

CROSS-REFERENCE TO RELATED APPLICATIONS

This application claims priority to PCT Application No. PCT/EP2022/054504, having a filing date of Feb. 23, 2022, which claims priority to EP Application No. 21159947.7, having a filing date of Mar. 1, 2021, the entire contents both of which are hereby incorporated by reference.

FIELD OF TECHNOLOGY

The following relates to a method of controlling the operation of a power plant that comprises plural energy systems, which include renewable energy generating systems such as wind turbines. The following further relates to a respective control system for controlling the operation of such power plant and to a computer program.

BACKGROUND

The use of energy from renewable sources is proliferating. Wind farms and solar power plants are only few examples of renewable plants that feed electrical energy into the power grid. Energy storage systems are further in use, such as batteries, thermal storage systems or storage systems based on gravitation, e.g. a pump storage power plant. Each of these energy systems has its own properties and is generally individually controlled. For example a wind turbine will experience certain loads, and accordingly will suffer a certain wear and tear, which is generally different for other wind turbines and other energy systems. The control system of such energy system, such as the wind turbine controller, may then take the energy system's status into consideration when controlling the wind turbine.

An example of such wind turbine control method is for example described in the document WO 2019/214785 A1, wherein a fatigue load that the wind turbine has experienced in the past is estimated based on measurements and is used to modify the control strategy for the wind turbine. The operation of the wind turbine thus occurs on the basis of the individual conditions of the respective wind turbine, so that account can be taken of the local conditions and load experienced by the wind turbine in the past.

Another example is the document US 2013/0161949 A1, wherein fatigue load for operating a wind turbine is considered. The operating range of each wind turbine is adjusted such that each wind turbine operates in a range in which the fatigue load does not have a maximum. The mean life of the wind turbines may thereby be improved.

The document US 2013/0184884 A1 further describes a system for generating, controlling and storing dispatchable renewable energy which includes one or more wind power generation facilities and one or more solar power generation facilities. The system supplies power to a power grid at a level that is determined by actual or predicted weather conditions and that is further based on a variable power demand.

The document US 2008/0171979 A1 describes a method of generating a control schedule for a wind turbine, wherein the control schedule can overrate the power output of the wind turbine and is selected such that a predetermined minimum wind turbine lifetime is achieved.

It is however desirable to improve the overall performance of plural wind turbines and in particular of power plants that include renewable energy generating systems and energy storage devices. Conventional control methods may not achieve the desired performance, since they in particular disregard interactions between different energy devices and interactions between the different control features using which such energy devices operate.

SUMMARY

Accordingly, there is a need to improve the operation of a respective power plant and in particular to operate such power plant in an efficient way that for example improves a desired operating characteristic of such plant, such as the residual lifetime of the energy systems, the energy production (in particular the amount of electrical energy fed into the power grid), or satisfaction of a power demand for power delivery to the power grid.

According to an embodiment of the present invention, a method of controlling the operation of a power plant is provided. The power plant comprises plural energy systems (ESs) that are individually controllable, wherein the plural energy systems comprise at least plural renewable energy generating systems of at least one type, such as wind turbines. The plural energy systems are coupled to a power grid for exchanging electrical power with the power grid. The method comprises obtaining operating data of at least the renewable energy generating systems, the operating data being at least indicative of a lifetime consumption (e.g. loading) of the renewable energy generating systems; obtaining estimated environmental data that estimates one or more future environmental conditions; and modeling at least one of residual lifetime, energy production or power demand satisfaction for a power demand from the power grid for the energy systems of the power plant. The modeling is based on the obtained operating data and is performed for a future period of time using the estimated environmental data. The modeling considers a modification of one or more, for example plural, operating modes of at least the renewable energy generating systems (compared to the current operating modes of these systems). Based on the modeling, the operation of the power plant is adjusted.

Such method may allow the evaluation of the effect of a modification of the operating modes of the power systems on the respective residual lifetime, energy production or power demand satisfaction. Furthermore, since such modeling is based on the actual current conditions of the ESs, and further takes future environmental conditions into account, such as wind speeds or solar radiation, a precise estimation of the modeled quantities can be obtained. This allows the determination which of the available operating modes achieves the desired operating characteristics of the power plant, such as a maximization of lifetime, energy production, or power demand satisfaction. The modeling for example allows a quite precise determination of how energy production will change if certain operating features of the renewable energy generating systems are turned on and turned off, and how that influences the energy production of the overall power plant. The desired operating characteristics can thus be better met. In embodiments, modification of the operating mode may occur by activation or deactivation of at least one overrating or de-rating feature (for example, by a combination of such features in embodiments).

Regarding the residual lifetime, the residual lifetime for each of the one type of renewable energy generating systems may be modeled, or for each of the renewable energy generating systems, or for all ESs. Regarding energy production, the energy production of the overall power plant, and/or each of the type of renewable energy generating systems, or of each renewable energy generating system, or of all ESs may be modeled. Modeling of the energy production may consider the modeled residual lifetime of the renewable energy generating systems. For a storage system, it should be clear that such ES generally does not produce energy. However, depending on the needs of the power plant, the storage system may either provide electrical energy (positive energy production) or store electrical energy (negative energy production). Regarding the power demand satisfaction, it is modeled how good the expected future power demand will be met by the power output of the power plant. The operating modes of the renewable energy generating systems may in the modeling be selected so that the power demand is satisfied. For example if the power demand is expected to be high at specific days, then the power production may be increased for these days and reduced for other days. Modeling the power demand satisfaction may for example occur by determining how often the power demand is met or not met, or by aggregating the deviation of the power production compared to the power demand. Meeting the power demand may for example ensure that the power grid will be operated in a stable manner, in particular that no over-voltages or under-voltages occur on the power grid. This again will guarantee that the renewable energy generating systems do not run into unstable operating modes such as low voltage ride-through operation. As the power demand is often proportional to the electricity price (which is high for high demand), the electricity price may be a quantity that can be considered instead of the power demand, with a similar effect on the stability of the power grid. Accordingly, the modeling may also include the modeling of revenue obtained by providing produced electrical energy to the power grid (e.g. in addition to modeling energy production). Operation of the power plant may thus be adjusted based on such modeled revenue, in particular by choosing operating modes that maximize the revenue.

In embodiments, the modeling considers the interaction between the plural energy systems. For example, the interaction between the plural renewable energy generating systems of the same type (e.g. among different wind turbines) or of different types (e.g. between wind turbines and solar systems), as well as with other ESs, such as storage systems, can be considered. Such interaction greatly increases the flexibility of operating the different ESs, as for example excess electrical power produced by wind turbines can temporarily be stored in energy storage systems, or when power demand is high and wind speed low, stored electrical energy can be discharged into the power grid. The possible operating modes that can be considered in the modeling for the different renewable energy generating systems can thus be employed more flexibly and with less strict boundary conditions. A precise modeling of the operating characteristics of the power plant thus become possible, which allows the choosing of operating modes that best exploit the benefits achieved by using such different ESs in the power plant.

In embodiments, the plural energy systems comprise at least one energy storage system. In embodiments, the modeling considers the interaction between the at least one energy storage system and the plural renewable energy generating systems. The at least one energy storage system may be at least one or a combination of an electrochemical storage system, in particular a battery storage system, a thermal storage system and a gravity-based storage system, such as a pumped storage system. Such energy storage system may for example be considered in the modeling by taking up electric energy when excessive energy is available or when power demand is low and discharging electric energy when not enough electric power is produced or when the demand is high. The energy storage system may for example be operable in a charging mode in which it takes up electrical energy, a discharging mode in which it discharges electrical energy and in an idle mode, in which it is inactive (i.e. keeps its charging state). These modes may be employed as required during the modeling of the power plant for the future period of time.

The modeling for the future period of time may for example consider storing energy generated by the renewable energy generating systems in the at least one energy storage system during some sections (i.e. time periods) of the future period of time and retrieving stored energy from the energy storage system during other sections of the future period of time. As mentioned above, the demand of energy is usually proportional to the electricity price so electrical energy may be stored in the storage device when electricity price is low and may be discharged when the electricity price is high. One, two three or more energy storage devices of the same type may be provided, or different types of energy storage devices may be employed in the power plant.

The plural energy systems may comprise at least one hydrogen production system configured to produce hydrogen from electrical energy. Such hydrogen production system may receive electrical energy from the renewable energy generating system (e.g. wind turbines or solar system) and use it to produce hydrogen ($H_2$) through, e.g., electrolysis. Produced hydrogen can then be either stored or transported to end-users. The modeling for the future period of time may for example consider providing electrical power from the energy generating systems to the hydrogen production system, for example when power production is high but power demand from grid is low. Both, an energy storage system and a hydrogen production system may be comprised in the power plant.

The renewable energy generating systems may comprise only one type, but may also comprise two types or more types of renewable energy generating systems. They may for example comprise at least two types selected from the group comprising or consisting of wind turbines; solar energy systems, in particular solar thermal systems and/or photovoltaic systems. The one type of renewable energy generating systems may comprise wind turbines in embodiments.

The operating data, which is indicative of the lifetime consumption, i.e. how operation affects the ES's lifetime, may in particular be indicative of a current residual lifetime of the renewable energy generating systems. It may be indicative of the loading of the renewable energy generating systems, for example of a fatigue loading (in particular of wind turbines), thermal loading or electrical loading (for example for wind turbines and/or solar systems). The operating data may also be indicative of the lifetime consumption of other energy systems, such as energy storage systems; it may for example indicate a thermal loading, a number of charging/discharging cycles or the like of such energy storage system.

Obtaining operating data for at least the renewable energy generating systems, may for example comprise obtaining sensor data from sensors provided on the renewable energy generating systems (e.g. strain sensors, speed sensors, thermal sensors, bending sensors and the like) and/or obtaining measurement data related to the operation of the respective energy system (e.g. currents and voltages associated with the operation; produced electrical power, e.g. cumulated annual energy production (AEP); number of charging/discharging cycles; cycle width of charging/discharging cycle (the latter two relating to a storage system) or the like. In embodiments, obtaining operating data may further comprise obtaining operating data of the at least one energy storage system, said operating data being related to the electrical loading of the energy storage system. Based on such operating data, a precise estimate of the residual lifetime at the current point in time becomes possible, which thus provides a solid basis for the modeling.

As an example, obtaining estimated environmental data comprises the obtaining of at least one of an estimated or predicted wind distribution; an estimated or predicted solar radiation; and in embodiments may further comprise the obtaining of at least one of an estimated or predicted power demand present on the power grid; and an estimated or predicted electricity price for electrical energy supplied to the power grid. Past data, which may for example have been obtained over a certain period of time, such as one or more years, may for example be used as a basis for estimating or predicting the respective environmental data. As an example, a sample wind distribution may be generated, or a sample distribution for predicted power demand. The estimated or predicted environmental data may for example be based on statistical data and may be provided in the form of statistical data, for example a mean power demand on a certain day of the year (although a finer granularity may certainly be used).

The future period of time for which the modeling is performed may be a predetermined end of life of at least one type of the renewable energy generating systems (e.g. related to a nominal lifetime), for example the end of life of the wind turbines. Depending on the type of wind turbine model, this may for example be a value of 20 to 30 years, for example 20 years or 25 years from start of operation. By performing the modeling over such long period of time, it can be precisely evaluated what the effect of the operating modes is on the lifetime of the energy systems in the long run, and it can be taken into account if a certain operating mode results in the residual lifetime expiring before such predetermined end of life. As the modeling is performed for the plural energy systems and considers the operating modes of these systems, interactions between the operating features of these modes and between the plural ESs are taken into account, resulting in precise estimations.

In an embodiment, at least each of the renewable energy generating systems is operable in one of plural different operating modes, wherein different operating modes differ by a different activation state of one or more operating features (e.g. over-/de-rating features) and/or a different setting of one or more operating parameters. The modeling is performed as part of an optimization method for determining an optimized operating scheme for the operation of the power plant, wherein the operating scheme defines an operating mode at least for each of the renewable energy generating systems of the one type (e.g. wind turbines), wherein performing the optimization method comprises: Performing said modeling for at least one, for example for each of plural, candidate operating schemes, where each candidate operating scheme defines a different combination of operating modes (in particular at least for the type of renewable energy generating systems, for example, at least two types in embodiments, and optionally also for other ESs, e.g. one or more storage systems, or for example for each ES of the plant), wherein the modeling is based on the operating modes of the respective candidate operating scheme (i.e. the modeling operates the respective ES in the operating mode as defined in the candidate operating scheme). The optimization method further comprises, based on the modeling, selecting one of the modeled operating schemes as the optimized operating scheme, the selection being made in accordance with at least one optimization criterion. In embodiments, adjusting the operation of the power plant may then be performed by operating the power plant in accordance with the selected optimized operating scheme. In embodiments, the at least one candidate operating scheme may include at least the modification of the one or more operating modes of the renewable ESs compared to current operating modes of these systems.

The operating modes of at least the renewable energy generating systems may for example specify an activation state of one or more overrating features or de-rating features, which increase/decrease the energy production by the respective energy generating system, respectively, which usually has an opposite effect on residual lifetime.

Although the operating scheme may specify for each ES (e.g. wind turbines, solar systems, hydrogen production systems, storage systems, as far as present in the power plant) an operating mode, it should be clear that some ESs may simply be operated in their default mode and thus do not need to be comprised in the operating scheme (for example if the available different operating modes of such ESs have only limited impact on lifetime/energy production, which may for example be the case for solar systems). However, the operating scheme may simply define such default mode for these systems. Also, it should be clear that the operating scheme may define a similar operating mode for each ES of a certain type, such as for wind turbines, although it may be preferred in embodiments that an operating mode is defined in the operating scheme for each individual ES. This way, it is possible to align the residual lifetime and the energy output of the different ESs. ESs that have excess lifetime may for example be operated in a more aggressive operating mode, in which the energy output is increased, compared to systems that have only little residual lifetime left or the residual lifetime of which is likely to expire prior to the predetermined end of life. In embodiments, the candidate operating scheme may define at least an operating mode for each of plural wind turbines. Accordingly, in some embodiments, the optimization may be performed for the operating mode of each of the plural ESs, whereas in other embodiments, the optimization may only be performed for one or two types or for plural predetermined types of ESs.

As an example, the optimization criterion is one or a combination of: a maximization of a residual lifetime of at least one type of said renewable energy generating systems (in particular of wind turbines); minimization of a deviation of the modeled residual lifetime from a target lifetime for at least one type of said renewable energy generating systems (in particular for wind turbines); maximization of the energy production of the power plant in a predetermined second future period of time (for example of the annual energy production, or the energy production until the predetermined end of life, e.g. of one type or all of the energy systems, e.g. of wind turbines); maximization of a power demand satisfaction for a power demand of the power grid (e.g. maximization of the power delivery by the power plant at high power demand; low delivery at low demand; the maximization may be performed for a predetermined second future period of time, e.g. annually or until the predetermined end of life); and maximization of revenue generated by delivery of electrical energy produced by the power plant to the power grid (e.g. for a predetermined second future period of time, e.g. annually or until the predetermined end of life). As mentioned above, the latter criterion is an equivalent to delivering the power at times of high demand, as the price is generally high at high demand; consequently, the power grid is also stabilized by delivering electric power at times of high electricity price. The optimization criterion may also be termed optimization target. In other examples, the lifetime of all ESs may be maximized. The deviation from a target lifetime may for example be an average deviation or a cumulative deviation (e.g. minimization of the sum of the deviation for all ESs participating in the optimization, e.g. all wind turbines).

In an embodiment, the plural renewable energy generating systems comprise at least plural wind turbines, wherein the operating mode for a wind turbine defines at least an activation state of one of the following operating features: an adaptive control system, ACS, control feature that reduces the output power of the wind turbine if turbulences above a threshold are determined at the wind turbine; a power boost, PB, control feature that increases the power output of the wind turbine by increasing the power limit of the wind turbine under predetermined wind conditions; a high wind ride through, HWRT, control feature that performs a load based reduction of the output power of the wind turbine at predetermined wind conditions, in particular above a maximum wind speed (i.e. power output is maintained above a maximum wind speed at which the wind turbine would shut down without activation of HWRT); a power curve upgrade kit, PCUK, control feature that modifies a control function of a wind turbine controller, in particular the pitch angle control, in dependence on hardware modifications installed on the wind turbine, in particular on the rotor blades; and a peak shaving feature that changes the operating curve using which the wind turbine controller operates the wind turbine, the operating curve determining wind turbine settings, in particular rotor speed and pitch, in dependence on wind speed. Other control features may likewise be considered, including new control features as they become available.

Additionally or alternatively, the operating mode for an ES may for example specify an operating parameter such as power curtailment of the ES (i.e. different operating modes may specify different levels of power curtailment). Considering such curtailment for example allows the increase of the residual lifetime at the expense of energy production, and further has an effect on downstream wind turbines.

In some implementations, in the candidate operating schemes, the operating modes for at least one type of ES, in particular for wind turbines, are kept constant for the period of time of the modeling. In embodiments, the operating modes may be kept constant for all ESs. The modeling of the ESs of the power plant is thus simplified significantly.

In a particular example including an energy storage system, modification of one or more operating modes may include modification of an operating mode of an energy storage system. The operating mode for the energy storage system may define at least one of the following operating features and/or operating parameters: A current level or current level limit for electrical current provided or received by the energy storage system; a cycle width of a charging/discharging cycle for the energy storage system; and a reference for a charging state of the energy storage system. Such different operating modes of the energy storage system impact the electrical energy that can be supplied to the power grid and further impact the lifetime of the energy storage system. By considering these in the optimization, an aligned lifetime of the energy storage system can be achieved and power production or power demand satisfaction can be maximized. The operating scheme may define a respective operating mode for the at least one energy storage system.

As another example, the renewable energy generating systems comprise at least one or more solar systems (for example, in addition to plural wind turbines in embodiments), wherein, in embodiments, the operating mode for a solar system may define at least one of the following operating features and/or operating parameters: A current level or level limit for electrical current provided by the solar system; a control parameter related to a tracking mechanism of the solar system; a control parameter related to a form of energy conversion performed by the solar system (for example of a heat to electricity conversion, such a temperature setting or the like); and a control parameter related to an electric power conversion performed by the solar system (for example an operating parameter of an inverter comprised in the solar system). Again, by optimizing the operating mode for such solar system in the power plant, the lifetime of a solar system may be aligned with the one of another solar system or of another ES, and overall energy production, power demand satisfaction, or revenue may be maximized.

During the modeling over the future period of time, the residual lifetime of one of the plural ESs may expire (i.e. residual lifetime<0) for an ES for which the modeling is performed. The energy production of such ES and/or a revenue achieved by such ES may then be set to zero. Accordingly, a premature end of life of such ES is penalized and the corresponding candidate operating scheme that results in such premature end of life may accordingly not be selected.

In some implementations, the operating scheme may specify for at least one operating feature of a renewable energy generating system a condition for the activation and deactivation of the operating feature, wherein, in embodiments, the condition may be related to at least one of power demand of the power grid or electricity price for electrical energy delivered to the power grid (which are approximately equivalent, as outlined above). Considering such condition may enable the defining of an operating scheme that for example enables operating features (overrating) that maximize the power output of the energy system when the power demand or electricity price is high and enables operating features (de-rating) that maximize lifetime when the power demand or electricity price is low. The consideration of such condition may thus be particularly useful for maximizing the power demand satisfaction and/or maximizing the revenue. As an example, if the demand is above a threshold, the respective features may be activated/deactivated to maximize energy production, and if the demand falls below this threshold or a second threshold, the operating features may be activated/deactivated to maximize lifetime.

In some embodiments, the modeling may also consider the modification of a common operating mode of the plural renewable energy generating systems. For example, the operating scheme may further specify the activation/deactivation of a common operating mode, which is thus also considered in the modeling performed for the respective candidate operating schemes. Such common operating mode may affect some or all of the respective renewable energy generating systems, and may in particular consider interaction between the individual renewable energy generating systems, such as between individual wind turbines. Examples of such common operating mode are wake adapt, wherein, when activated, operation of the wind turbines is adapted on a wind farm level by turning the wind turbines out of the wind by a controllable angle (e.g. using the yaw drive). The wake of the wind turbines is thereby controlled, so that wake losses from which downstream wind turbines suffer if in the wake of upstream turbines can be reduced significantly, with positive effects on lifetime and performance (power production). Another example of such common operating mode is SAYC (active yaw control), which is a yaw control feature that, when activated, turns the turbines into plural pre-defined positions and collects data on how the different positions affect the power production. After collecting data for several periods, a decision is made by the controller which yaw position is the most beneficial for power production. The feature may further account for the yaw position of neighboring wind turbines, e.g. by acquiring respective data on power production.

The method may be performed automatically, e.g. by a respective control system that automatically models the respective quantities and automatically determines the optimized operating scheme.

According to a further embodiment of the present invention, a control system for controlling the operation of a power plant is provided. The power plant comprises plural energy systems that are individually controllable, the plural energy systems comprising at least one type of renewable energy generating systems, wherein the plural energy systems are coupled to a power grid for exchanging electrical power with the power grid. The control system is coupled to the power plant, in particular for controlling at least the plural renewable energy generating systems. The control system comprises a processing unit and a memory coupled to the processing unit, the memory storing control instructions which when executed by the processing unit perform any of the methods described herein. By such control system, advantages similar to the ones outlined further above may be achieved.

A further embodiment of the invention provides a computer program product (non-transitory computer readable storage medium having instructions, which when executed by a processor, perform actions) for controlling the operation of a power plant, wherein the computer program comprises control instructions which, when executed by a processing unit of a control system controlling the power plant (in particular at least renewable energy generating systems thereof), cause the processing unit to perform any of the methods disclosed herein. Again, by such computer program, advantages similar to the ones outlined further above may be achieved. The computer program, in particular the respective control instructions, may be provided on a volatile or non-volatile data carrier or storage medium.

It is to be understood that the features mentioned above and those yet to be explained below can be used not only in the respective combinations indicated, but also in other combinations or in isolation, without leaving the scope of embodiments of the present invention. In particular, the features of the different aspects and embodiments of the invention can be combined with each other unless noted to the contrary.

BRIEF DESCRIPTION

Some of the embodiments will be described in detail, with reference to the following figures, wherein like designations denote like members, wherein.

DETAILED DESCRIPTION

Figure 1:
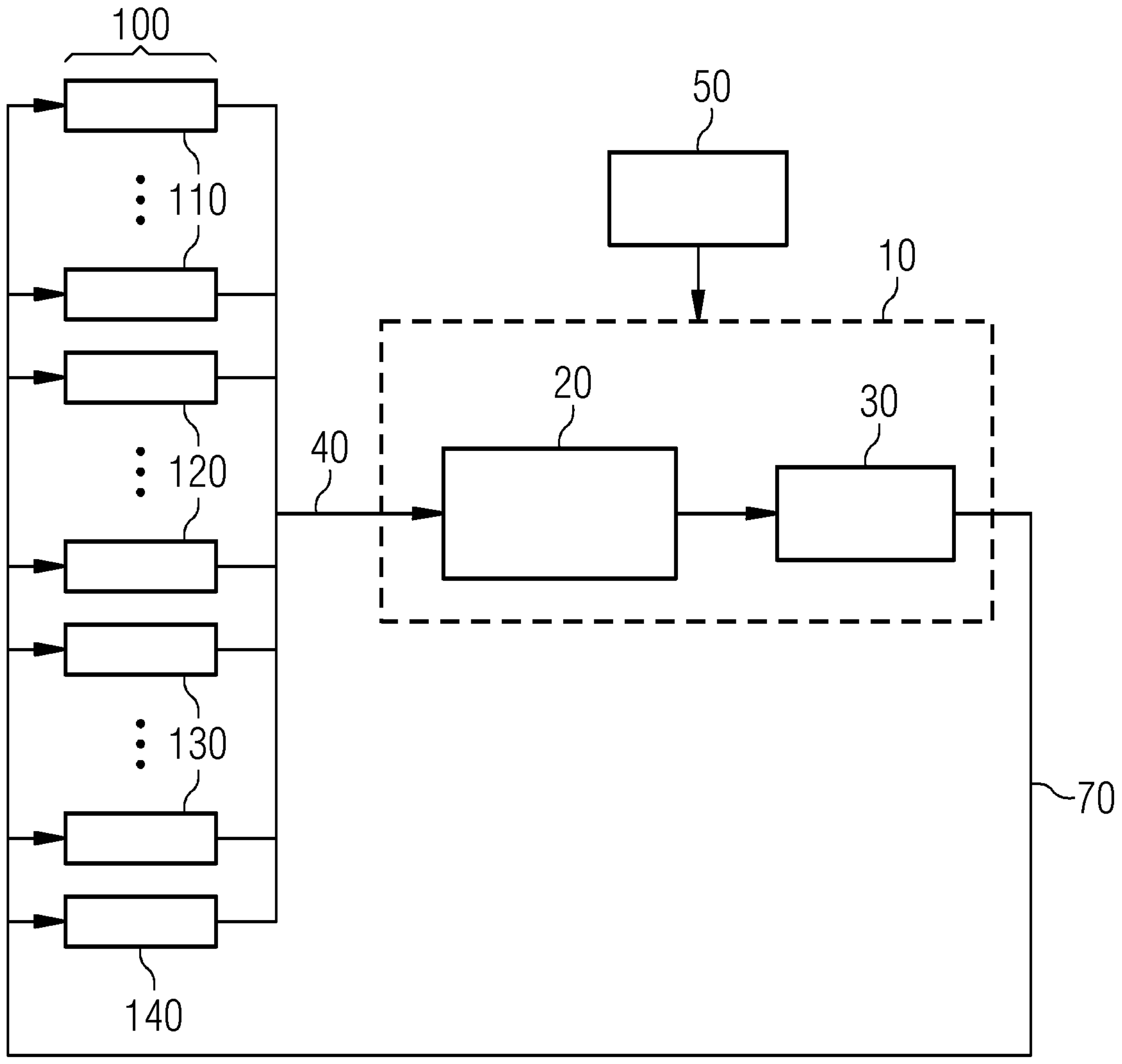
FIG. 1 is a schematic drawing showing a control system according to an embodiment of the invention.

In the following, embodiments of the invention will be described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically illustrates a control system 10 according to an embodiment. The control system 10 includes an operating scheme generating unit 20 that determines an optimized operating scheme 30. The control system 10 then controls the operation of plural energy systems of a power plant 100 in accordance with the determined optimized operating scheme. Power plant 100 includes at least one type of renewable energy generating systems and may include at least two types or even at least three types of such systems in embodiments. It may for example include at least 1 . . . n wind turbines 110, and 1 . . . m energy storage systems 130. It can further include 1 . . . k solar systems 120, one or more hydrogen production systems or other energy systems (ESs) 140. It should be clear that the numbers n, m, k may be different for each type of energy system (ES), and the power plant may for example include plural wind turbines (WTs) and solar systems in combination with a single storage system. As indicated in FIG. 1, each of the ESs of power plant 100 receives a control signal 70 from control system 10 and operates in accordance with the received control signal. It should be clear that in other configurations, some of the ESs may not be actively controlled by control system 10 (e.g. an independent or passive storage system).

The control system 10 receives operating data 40 from at least one type of renewable energy generating systems (such as WTs 110), and, for example, from each ES of the power plant 100 in embodiments. Such operating data 40 includes data that is indicative of the loading of the respective ESs, in particular data that is indicative of a residual lifetime of these ESs. Operating data 40 may for example include data on fatigue loading of wind turbines 110, data on thermal or electrical loading of solar systems 120, data related to the electrical or thermal loading of energy storage systems 130 (such as number of charging cycles, operating temperature, width of the charging/discharging cycle, and the like). Energy storage systems 130 may for example include batteries, but they may also include other types of storage systems, such as thermal storage systems (e.g. gravel-based storage systems employing an air cycle), or gravitational storage systems that for example pump water or other liquids to a higher level. The mechanical, thermal and electrical loading of these ESs generally determines the lifetime consumption of these ESs that has occurred in the past. By receiving the operating data 40, the control system 10 and in particular the optimization scheme generating unit 20 can derive information on the residual lifetime at a current point in time of the energy systems 110 to 140.

Operating data 40 may furthermore include data indicative of operating conditions and operating parameters of the energy systems 110 to 140, and may in particular include data indicative of the power generation by the renewable energy generating systems 110, 120. Control system 10 may include respective sensors for measuring such operating data (for example measuring voltage and current at an output of power plant 100 or of the individual ESs), or may obtain respective information from controllers of the ESs. Control system 10 thus has available the data required to derive the baseline performance of the ESs, in particular the energy production by the energy generating systems without enablement of specific overrating or de-rating features of these ESs. Baseline performance may in particular refer to the performance (energy production) of the renewable energy generating systems when operating in the conventional way without activation of specific features that increase or decrease the energy production.

Control system 10 and in particular the unit 20 further receives data 50 which includes environmental data. Environmental data can for example be the wind speed at the location of the wind turbines 110, or solar radiation at the location of the solar systems 120 and the like. Such data may for example be received from sensors installed at the location of the respective energy systems (wind sensor installed on wind turbines 110; solar radiation data from sensors installed at the location of the solar system 120 or directly from solar panels forming part of solar system 120 or the like. Respective environmental data may additionally or alternatively be received from external sources, such as a weather service or the like. Data 50 may thus include internally received data and externally received data. Control system 10 may for example receive environmental data related to past environmental conditions and may derive therefrom future environmental conditions. Such derivation may be performed by unit 20 for example under the assumption that weather patterns will repeat in a yearly cycle, or by using models for predicting future environmental conditions such as wind and solar radiation. Alternatively, control system 10 may also receive such predicted future environmental conditions directly as data 50 from an external data source.

Further data 50 that can be received by control system 10 includes information on a power demand from a power grid to which the power plant 100 provides produced electrical energy. Such power demand may for example be obtained from a grid operator, or it may be derived from the measurements taken on the power grid, such as from voltage variations (over-voltage or under-voltage) or frequency deviations of a grid frequency, which generally indicate an over-supply or under-supply of electrical power. At times of high power demand, the electricity price is generally high. Accordingly, the power demand available on the power grid may also be derived by monitoring the electricity price for electrical energy supplied to the power grid. Data 50 that is received by the control system 10 may accordingly include data related to the electricity price for such supplied electrical energy. Other data 50 that may be received include a user selection, which is explained in more detail further below. Based on such received power demand data or electricity price data, the unit 20 may in a corresponding manner predict or estimate a future power demand on the power grid and/or future electricity price. Alternatively, such predicted or estimated data for the future power demand and future electricity price may directly be received via data 50. As the power demand and the electricity price relate to the environment in which the power plant 100 is operated, they may also be referred to as environmental data.

Unit 20, which may also be termed "wind farm management system" (WFMS) processes the received data 50 and operating data 40 and derives therefrom the optimized operating scheme 30, by means of which it operates the energy systems 110 to 140 in a coordinated manner. The WFMS 20 can for example enable or disable different overrating/de-rating features for each energy system under consideration of both, the individual status of the respective energy system (ES) and the status of the remaining energy systems of power plant 100. It may likewise enable/disable different power plant features, in particular wind farm features of the wind turbines 110, and consider the impact on the lifetime and performance of the energy systems (common operating modes). The control system 10 modifies the operating scheme 30 in accordance with a predetermined optimization criterion, in particular to achieve a predefined optimization target. As the control system 10 provides a coordinated control of the different energy systems, it can determine for example how much energy is delivered to the power grid and how much is stored in the storage systems 130, considering data from all of the energy systems 110 to 140 and external information from data 50, such as power demand, electricity price, grid services price, and other parameters. Control system 10 thus allows the alignment of the lifetime of the different energy systems and furthermore allows for example maximization of the overall energy production or revenue of the power plant 100, or maximization of the power demand satisfaction.

Figure 2:
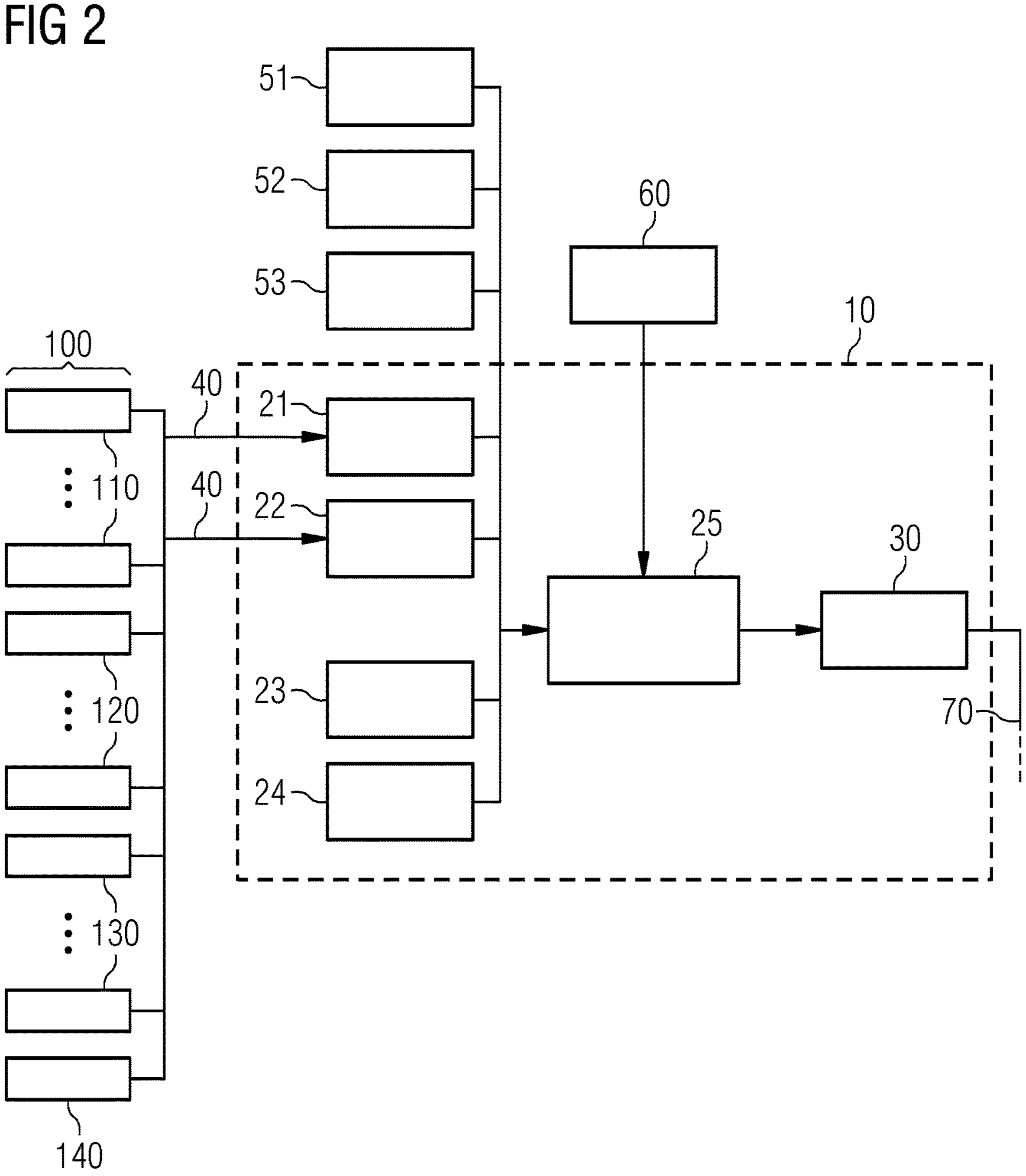
FIG. 2 is a schematic drawing showing functional components of a control system according to an embodiment of the invention.

FIG. 2 illustrates further details of the control system 10 of FIG. 1, so that the above explanations are equally applicable. Data 50 received by control system 10 includes the environmental data 51. It further includes power demand data 52 and additionally or alternatively electricity price data 53. It can further include other external data, such as grid services price data, forecast or predicted environmental data, forecast or predicted power demand data, forecast or predicted electricity price data and the like. The received data 50 further includes input data 60 that determines an optimization criterion or optimization target in accordance with which the control system is operated. Such input allows a user (e.g. power plant operator) to choose the strategy in accordance with which the power plant is to be operated. The operator may for example choose a lifetime optimization strategy in accordance with which a maximization of the lifetime or the reaching of a predetermined target lifetime is determined as an optimization criterion or optimization target. In embodiments, such lifetime optimization criterion may apply to at least one type of renewable energy generating systems, and in particular to the wind turbines 110. It may also apply to more than one type of renewable energy generating systems 110, 120, 140, and may also apply to the energy storage systems 130. The residual lifetime of the WTs may for example be maximized, or the WTs may be operated to achieve the target lifetime. For some WTs, this can mean that the performance (energy production) is to be reduced (e.g. if the expected lifetime is 22 years but the target lifetime is 25 years), while for other wind turbines, it can mean that the wind turbine is operated with a higher output at specific wind speeds and thus more aggressively (e.g. expected lifetime of 27 years and target lifetime of 25 years). In such strategy, the average or cumulative deviation of the lifetimes of the respective energy systems from the target lifetime for these energy systems is for example minimized by the control system 10.

Another strategy, which the operator may choose, is a maximum performance strategy, in which the optimization criterion or optimization target is a maximization of the energy production by the power plant 100, in particular by the energy generating systems thereof. The maximization may occur for a predetermined future period of time, such as a year (maximization of annual energy production, AEP), or for example until the predetermined end of life (e.g. 20 or 25 years for wind turbines). Another strategy that may be chosen by the operator may be a power demand satisfaction strategy, in which the power demand satisfaction for a power demand of the power grid is maximized. This means that at high power demand on the power grid, the power plant 100 is controlled to deliver a high power output (which may be at the expense of lifetime, due to the enabling of respective overrating features), and in times of low power demand, power plant 100 operates at a low power output (resulting in respective benefits for the residual lifetime of the energy systems, for example by activating respective de-rating features and deactivating overrating features). Such optimization criterion results in a stabilization of the power grid, since the right amount of power is delivered to the power grid as it is needed. Power demand satisfaction may for example be determined as a deviation of the power delivered by the power plant to the power grid from the actual power demand present on the power grid (average or cumulative deviation).

The operating scheme 30 for such operating mode may for example specify certain conditions under which the respective overrating and de-rating features are activated/deactivated, the conditions depending on the present power demand on the power grid (for example by activating/deactivating the respective features if the power demand exceeds or drops below predefined power demand thresholds).

The operator may also choose a maximum revenue strategy, wherein the control system 10 is configured to operate with the maximization of the revenue generated by the delivery of electrical energy produced by power plant 100 to the power grid as an optimization criterion or optimization target. This optimization strategy is to some extent equivalent to the power demand satisfaction, as the revenue is indicative of the power demand on the power grid, so that by delivering a maximum amount of power at times of high electricity price also results in the meeting of high power demands and thus in the stabilization of the power grid. The revenue can be determined based on the received electricity price data 53 (and a respective forecast) and the estimated electrical energy delivered to the power grid. Similar to the power demand satisfaction strategy, overrating and de-rating features of the energy systems can be activated/deactivated in dependence on the level of the electricity price, for example by implementing respective thresholds in the operating scheme 30 that define the price levels above which or below which the respective operating features of the energy systems are activated or deactivated.

As the control system 10 further considers the energy storage systems 130 in the determination of the optimized operating scheme 30, the flexibility in determining the operating scheme 30 is increased and a better optimization result can be achieved. For example, the energy generated by the wind turbines 110 or solar systems 120 can be stored in the storage systems 130 when the electricity demand or electricity price is low, and the energy can be released when the demand is high or when there is not enough wind or solar radiation present to cover the power demand of the power grid. An operating scheme that can thus be obtained that better achieves the optimization target set by the operator.

FIG. 2 illustrates functional units of the WFMS 20 that are used for determining the operating scheme 30. The residual lifetime estimation unit 21 receives operating data 40, for example continuously during operation of the power plant 100, and estimates the actual residual lifetime of the energy systems for the current date. It may estimate the residual lifetime, for example, at least for the wind turbines 110, but may estimate it for each energy system 110 to 140 in embodiments. Unit 21 performs, e.g., a fatigue assessment based on the received data 40 for the individual energy systems, for which it uses sensor data from the energy system sensors so that information about the operation of the individual energy systems is available and is used. It may further employ a model of the respective energy system, such as an aeroelastic model for a wind turbine 110, in combination with the received sensor data to assess the current status of the energy system components' fatigue damage. Respective models of energy systems are known so that these will not be explained in greater detail here. Similar assessments can be performed for solar systems and for energy systems based on respective operating data 40. The estimation of the actual residual lifetime can furthermore take statistical data 55 into account (FIG. 3), which can be received as part of the data 50. This may for example be data on failure rates from a fleet of energy systems of the same model or the same component as the one being under consideration. By means of such information about the general behavior and failure rates of the respective model or component, the estimation of the actual residual lifetime of the energy systems can be improved significantly.

Baseline performance estimation unit 22 estimates the baseline performance of the energy systems based on the past operating data 40. Accordingly, it can be derived for the energy systems of power plant 10 for their current operating modes how much power was generated in the past by the respective systems. The data related to the actual residual lifetime of the energy systems provided by unit 21 and the actual energy production of the energy systems provided by unit 22 form a basis for the determination of the operating scheme and are provided to the optimization unit 25.

Further information that may be provided to optimization unit 25 includes information 23 on the impact of the activation/deactivation of operating features (in particular the overrating/de-rating features) and/or the setting of particular operating parameters on the residual lifetime of the energy systems, for example, at least of the wind turbines in embodiments. Optimization unit 25 is thus provided with a priori knowledge about how the activation/deactivation of certain operating features will impact the lifetime of the respective energy system. Unit 24 provides similar information with respect to how the activation/deactivation of certain operating features and/or the setting of certain operating parameters impacts the performance, in particular the energy production, of the energy systems (in particular of the renewable energy generating systems). This a priori knowledge for example indicates how the energy output of an energy system will change if an overrating or de-rating feature is activated or deactivated.

Figure 3:
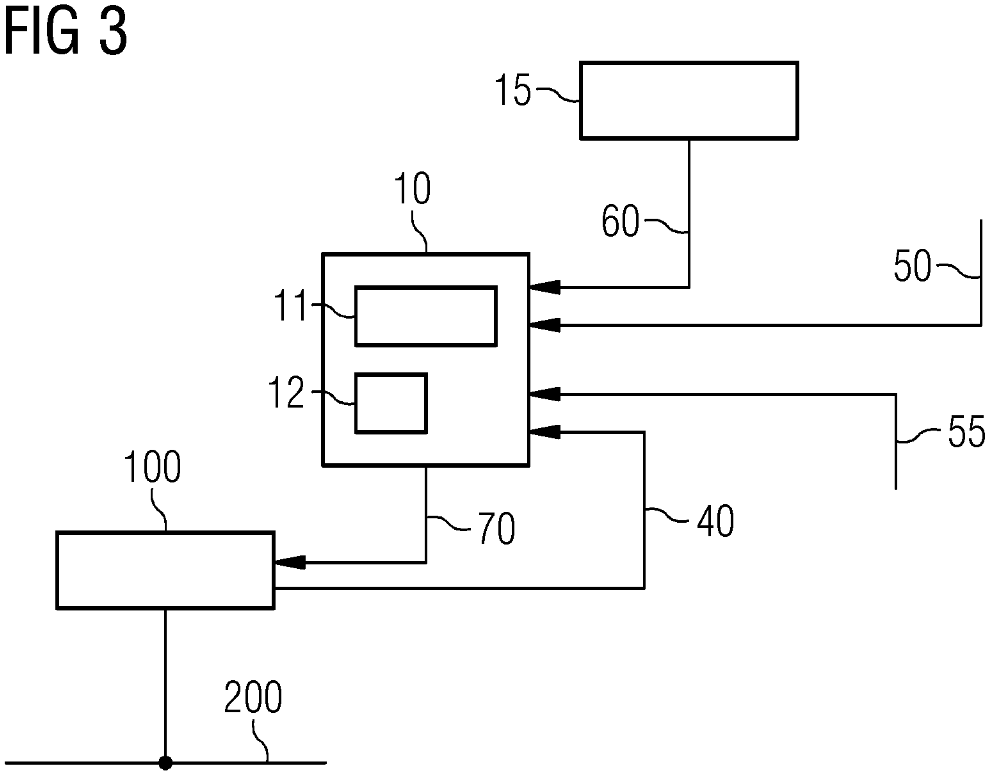
FIG. 3 is a schematic drawing showing a control system and its inputs and outputs according to an embodiment of the invention.

FIG. 3 illustrates the inputs and outputs to the control system 10. The control system 10 includes a processing unit

11, which may comprise any type of processor, such as a microprocessor, an application specific integrated circuit, a digital signal processor or the like, and a memory 12. The memory 12 may include volatile and non-volatile memory, in particular RAM, ROM, FLASH-memory, hard disc drives and the like. Control system 10 includes input and output interfaces for receiving data and for transmitting control data and control commands to the energy systems of power plant 100, which is coupled to the power grid 200 and supplies produced electrical energy thereto. Control system 10 may perform the communication wirelessly or via respective wires, such as a control bus, Ethernet or the like. The control system 10 includes the user interface 15 (e.g. including a display and an input device) via which the user input 60 from an operator is received. Control system 10 furthermore receives the statistical data on ES lifetime and failure rates 55, the further data 50 including environmental data and external data, such as energy demand/electricity price, and the operating data 40, e.g. from sensors of the energy systems. In accordance with the selected operating scheme, in particular the operating mode defined for each energy system therein, the control system 10 provides control instructions 70 to the respective energy systems of the power plant 100. The functional units 20-30 can be implemented as software running on the processing unit 11. Control system may also be de-centralized, and processing unit 11 may include plural distributed processors.

Figure 4:
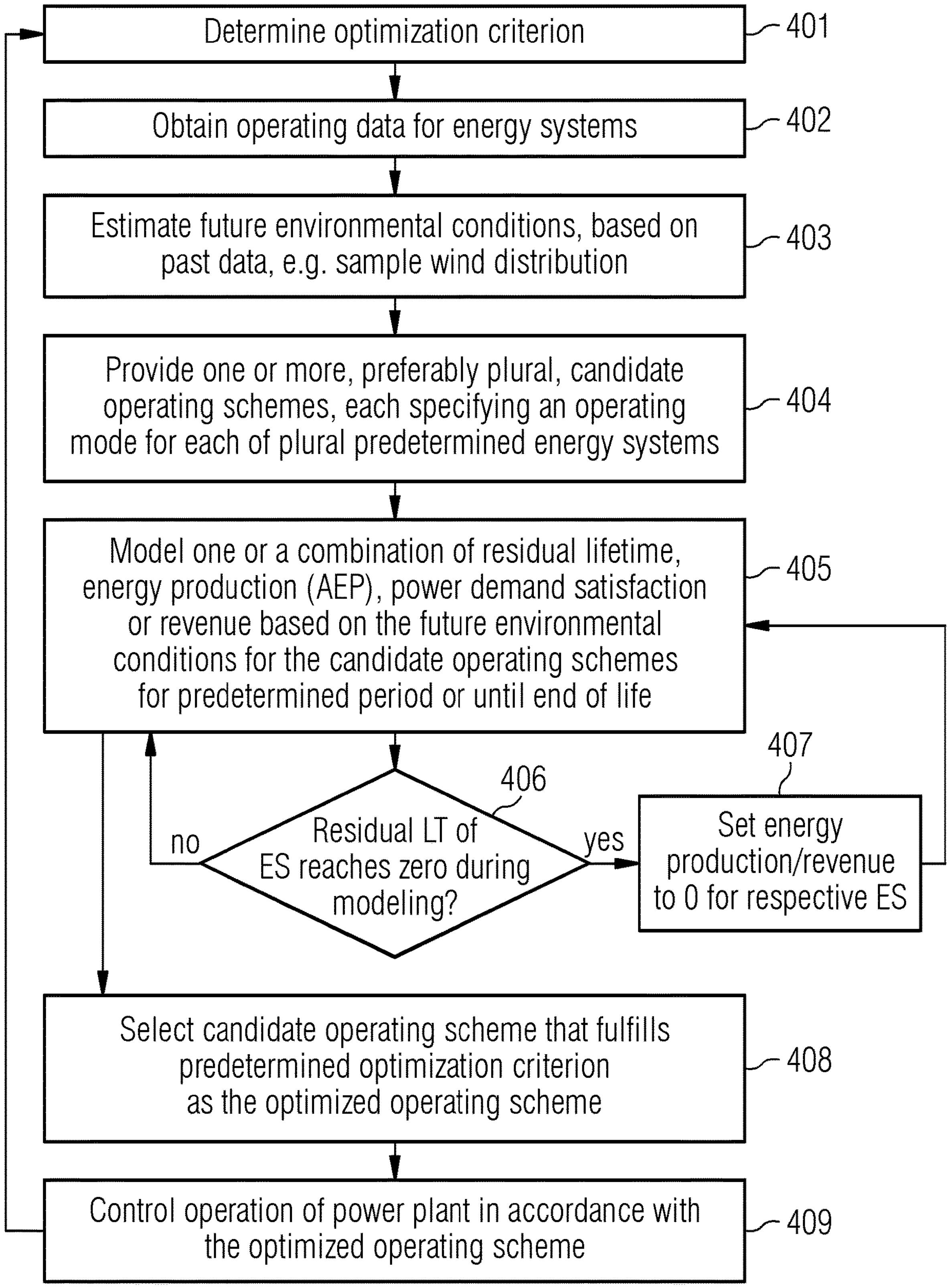
FIG. 4 is a flow diagram illustrating a method of controlling the operation of a power plant according to an embodiment of the invention.

Optimization unit 25 of FIG. 2 thus has available information from different sources that allows it to derive an operating scheme 30 that best achieves the optimization target set by the operator. FIG. 4 illustrates schematically an example of how such optimization of the operating scheme is performed by unit 25. In step 401, the optimization criterion is obtained by means of the input data 60 or by a pre-set criterion. In step 402, the operating data 40 for the energy systems 110 to 140 is obtained. In step 403, future environmental conditions are estimated based on the received environmental data 51, for example based on a sample wind distribution. As mentioned, future wind speed/wind distribution and/or solar radiation may be estimated for the future period of time. Step 403 is optional, and the respective data may also be directly obtained from an external source. Step 403 may furthermore include the estimation of other environmental/external conditions, such as estimation of the future power demand or future electricity price. Again, this data may also be directly obtained from an external source.

Plural candidate operating schemes are provided in step 404. Each operating scheme specifies an operating mode for each of plural predetermined energy systems of power plant 100. An operating mode for an energy system, such as a wind turbine, determines which operating features of the energy system are activated or deactivated, and/or the setting of one or more operating parameters of the energy system. In some implementations, the operating scheme may specify an operating mode for each one of the energy systems 110 to 140. In other implementations, the operating scheme may specify an operating mode for each energy system of one or more types of energy systems, for example only for wind turbines, or only for wind turbines and solar systems. The latter may be beneficial if for example very simple energy storage systems 140 are employed, which operate rather passively as a buffer and do not have specific operating features that can be activated or deactivated, or operating parameters that can be set.

For an individual wind turbine, the operating mode specifies the activation state (on/off) of one or more overrating and/or de-rating features. The activation state of one or a combination of the following features may in particular be specified by the operating mode:

The activation state of a high wind ride-through (HWRT) operating feature. When deactivated, the wind turbine may shut down if over a time interval (e.g. ten minutes), the mean wind speed exceeds a certain level (e.g. 25 m/s). Additional thresholds acting on shorter time intervals can be employed in this feature, e.g. setting a threshold for a 30 s wind speed average. When the HWRT control feature is activated, the wind turbine does not shut down under such predefined conditions, but it employs a load based reduction in the output power above a certain wind speed (e.g. 23 m/s for a certain period of time). The rotational speed of the rotor and the power output of the wind turbine are thereby gradually reduced with increasing wind speed (e.g. by pitching out the rotor blades). The wind turbine thus stays operational at higher wind speeds, while experiencing only slightly higher stresses. Increase in the energy production at the expense of residual lifetime is thus achieved (overrating feature).

The operating mode may specify the activation state of an adaptive control system (ACS) operating feature. If relatively strong turbulences are present in the air impinging on the wind turbine, loads above the design limits of the wind power system may occur and as well as overly fatigue of material. When deactivated, the wind turbine is shut down to prevent such overload conditions. When activating the ACS operating feature, the wind turbine controller reduces the output power of the wind turbine if turbulences above a threshold are detected at the wind turbine. Thereby, the fatigue load on the wind turbine can be reduced at the expense of energy production (de-rating feature). If the turbulences in the airflow are reduced again, the output power is ramped up again to the former value. The wind turbine controller may for example implement an ACS controller that uses a load model to determine the occurrence of respective turbulences that may cause overloading of the wind turbine.

The operating mode may specify the activation state of a power boost (PB) operating feature. Activated PB increases the energy production of the wind turbine by increasing a power limit under predetermined conditions (overrating feature). The wind turbine may for example operate at a limit of output power, yet the operation may occur below the load limit for structural loads of the wind turbine. The PB feature increases in such situations the rotational speed of the rotor proportional to the increase in output power. The net power production may be increased by up to 5% by such measure, at the expense of residual lifetime.

The operating mode may specify the activation state of a turbine load control (TLC) operating feature. A wind turbine controller may implement a turbine load control system that continuously monitors the structural loading on the wind turbine. When activated, if normal operating values are exceeded by the measured loads, the controller automatically regulates the operation of the wind turbine to bring the loads back into the design envelope. It may for example reduce the rotational speed of the rotor by a respective pitching of the rotor blades. Residual lifetime can thus be extended at the expense of energy production (de-rating feature).

The operating mode may specify the activation state of a power curve upgrade kit (PCUK) operating feature. After deployment, hardware upgrades may be installed on the wind turbine, for example aerodynamic improvements to the blades, such as flaps mounted to the trailing edge of the blade root to increase lift or flaps with serrated edges mounted to the trailing edge of the blade tip to enhance lift by extending the blade chord. Activation of the PCUK control feature modifies the wind turbine control to account for such hardware modifications and to enhance energy production, for example by adjusting the pitch control.

It should be clear that the wind turbines 110 may implement further operating features the activation state of which can be specified in the operating mode for the respective wind turbine, and that different operating modes for one wind turbine define different combinations or activation states of these features. The operating mode specified in the selected operating scheme is finally used to instruct the wind turbine controller to set the activation states as defined in the operating mode.

Similarly, an operating mode may be specified for a solar system 120. The operating mode may for example define a current level or a current level limit for electrical current provided by the solar system, a control parameter related to a tracking mechanism of the solar system (precisely tracking the position of the sun may increase the power output, however at the expense of the lifetime of such tracking mechanism); a control parameter related to a conversion of the energy form performed by the solar system (for example for thermal solar system (heat to electricity), a higher temperature level may improve efficiency at the expense of lifetime) and a control parameter related to an electrical power conversion performed by a solar system (for example running a converter at a higher current may increase the maximum available power output by the solar system at the expense of converter lifetime). Again, by such operating features and/or operating parameters, operation of the solar system may be overrated (at the expense of lifetime) or may be de-rated (increasing the residual lifetime).

For an energy storage system 130, the operating mode may for example specify a current level or current level limit for electrical current provided or received by the energy storage system (higher currents generally result in higher thermal/electrical loading of the storage system with a resulting decrease in lifetime); a cycle width of a charging/discharging cycle for the energy storage system (depending on the type of system, higher performance can be reached with a larger or smaller cycle width, e.g. operating the energy storage between 30% and 70% charging state instead of between 10% and 90%, with a respective effect on lifetime); and a reference for a charging state of the energy storage system (the charging state affects the performance in terms of power delivery when respective power is required, but may likewise have an effect on the lifetime of the energy storage system).

Further, as mentioned above, the operating scheme may specify certain conditions under which energy is for example stored or discharged from the energy storage device 130. It may for example specify respective thresholds for energy demand or electricity price above which energy is fed from the storage device to the power grid and below which energy is stored in the storage system.

The operating scheme thus determines how the individual energy systems are to be operated, and plural different such operating schemes can be determined as candidates in step 404. The different candidate operating schemes differ in the operating modes for the respective energy systems, i.e. which operating features are activated/deactivated and how operating parameters are set for the different energy systems. The determination of the candidate operating schemes may for example be based on the a priori knowledge provided by units 23 and 24, and depend on the optimization target provided as user input 60 and the actual residual lifetime and baseline performance provided by units 21, 22. If the optimization target is a target lifetime, candidate operating schemes may be provided such that for wind turbines having actual residual lifetime above the target lifetime, overrating features are activated, whereas for wind turbines having an actual residual lifetime lower than the target lifetime, derating features are activated. In some implementations, only one candidate operating scheme is provided in step 404.

In step 405, one or a combination of residual lifetime, energy production, power demand satisfaction or revenue are modeled, in dependence on the optimization criterion. The modeling is performed for the one or more candidate operating schemes and is based on the future environmental conditions obtained in step 403. The modeling is performed for a predetermined future period of time, which may for example be one or more years, or for example, is performed until a predetermined end of life of for example one type of energy generating system, such as the wind turbines 10, or of the power plant 100. The predicted wind speeds, solar radiation, power demand and/or electricity prices are thus used to model the future operation of the power plant and to derive therefrom the estimates for the desired quantity. As residual lifetime and energy production are generally also required for maximization of total energy production, power demand satisfaction, or revenue, these quantities may be always modeled in some embodiments. It should be clear that some operating modes comprised in the candidate operating schemes may consume more lifetime of energy systems than others. For some candidate operating schemes this may result in that the residual lifetime of one or more energy systems becomes zero or negative, which is checked in step 406. If such a situation occurs, it is assumed that the respective ES does not operate any further and that no further energy is produced or revenue generated. Accordingly, the respective values are set to zero in step 407, so that the respective ES does no longer contribute to the modeling. It should be clear that the steps 406 and 407 form part of the modeling step 405.

Step 405 may for example be implemented by a respective simulation that employs models of the energy systems, such as engineering models or trained models that deliver for respective inputs (operating parameters and environmental conditions) an output in terms of lifetime consumption and energy production. By using the different candidate operating schemes, different scenarios can thus be simulated and the resulting effect on residual lifetime, energy production, power demand satisfaction and/or revenue can be evaluated. The performing of such modeling has the advantage that for the individual energy systems, the interaction between the activation/deactivation of the respective control features is taken into account. Furthermore, since the modeling is performed for the whole power plant, i.e. for each energy system of the power plant, the interaction between the different energy systems is likewise considered in the modeling. This not only involves the interaction between for example the wind turbines and the energy storage systems, which are relevant for the power flow and the power output of the power plant, but also interactions between the different renewable energy systems, such as between the different wind turbines of the wind farm. Wind farm related control features, such as wake adapt or SAYC, can thus be taken into account in the modeling and the finding of an optimal operating scheme.

Based on the modeling, the candidate operating scheme that fulfills the predetermined optimization criterion is selected in step 408 as the optimized operating scheme. If the optimization criterion is a target lifetime, then the candidate operating scheme is selected for which the cumulative deviation of the lifetime from the target lifetime is lowest. If the power demand satisfaction is the optimization criterion, then the candidate operating scheme is selected for which the deviation of the power production from the power demand of the grid is lowest. Similarly, if power production maximization or revenue maximization is the optimization criterion, then the candidate operating scheme providing the maximum power production or the maximum revenue is selected as the optimized operating scheme. The selected scheme is provided as the optimized operating scheme 30 (FIG. 2). In step 409, the operation of the power plant is controlled in accordance with this optimized operating scheme 30. In other words, each energy system operates in accordance with the operating mode specified in the selected operating scheme, and the common operating modes may likewise be activated or deactivated as specified by the selected scheme. An optimized operation of the power plant can thus be found and implemented, and the operation of each energy system considers the individual energy system status and also the status of the remaining energy systems of the power plant.

As indicated by arrows in FIG. 4, the method may be repeated after a certain period of time. The method may for example be run weekly, monthly, every half a year, or yearly. Accordingly, the operating scheme may be adjusted repeatedly and based on the up-to-date information (operating data 40) provided by the energy systems to the control system 10. The control system 10 thus knows how the selected operating parameters of the operating scheme 30 influence the lifetime and the performance (energy production) of the energy systems, as evaluated in units 21 and 22. Accordingly, this information can be taken into account in the next iteration of the method. Selection of the candidate operating schemes in step 404 and/or modeling in step 405 can thus be improved based on the measured effects of the operating scheme. The optimization target can thus be better achieved.

It should be clear that different implementations are conceivable for the optimization method illustrated in FIG. 4. Different candidate operating schemes may for example be determined based on the a priori knowledge in step 404, and the modeling may be performed in step 405 for each of these candidate operating schemes. In another implementation, steps 404 and 405 may be implemented as an iteration loop in which in each turn of the loop, the candidate operating scheme is adapted by changing the operating modes defined therein and is modeled thereafter. The optimization criterion may then define a certain criterion upon the reaching of which the loop is stopped, such as a total energy production or revenue above a threshold, or a deviation from a target lifetime or power demand satisfaction below a threshold. In other implementations, steps 404 and 405 (including steps 406 and 407) may form part of an optimization algorithm that varies the operating modes in the candidate operating schemes to find the candidate operating scheme that best achieves the optimization target. Respective optimization schemes and search methods are known in the art and will not be explained in greater detail here.

The method thus allows the simulation of different operating scenarios and the finding of the operating scheme that achieves the optimization target, which is selected for the next operation period. It should be clear that additional parameters may be considered during the optimization. For example when optimizing revenue, grid services price may be considered as a further parameter. The method allows a balancing of the lifetime of the energy systems and the power production, in particular the meeting of the power demand. Furthermore, it is possible for the operator to select the desired optimization strategy, and the control system automatically determines the operating scheme that best meets the respective optimization criterion. Plural different energy systems can thus be optimized and coordinated within the power plant. The optimization occurs globally based on properties and operational data of the energy systems and based on external data. The operating scheme prevents that some energy systems are overloaded while others are under-loaded. Use of the energy systems, total power production, and grid stability may thus be enhanced by the respective operating scheme.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling the operation of a power plant, wherein the power plant comprises plural energy systems that are individually controllable, the plural energy systems comprising plural renewable energy generating systems of at least one type and at least one energy storage system, wherein the plural energy systems are coupled to a power grid for exchanging electrical power with the power grid, wherein the method comprises:

obtaining operating data of at least the renewable energy generating systems of said type, the operating data being at least indicative of a lifetime consumption of the renewable energy generating systems;

obtaining estimated environmental data that estimates one or more future environmental conditions;

modeling at least residual lifetime of the plural renewable energy generating systems of said type and energy production of the power plant under consideration of the modeled residual lifetime, wherein the modeling is based on the obtained operating data and is performed for a future period of time using said estimated environmental data, the future period of time being a predetermined end of life of the renewable energy generating systems of said type, the modeling being performed for different operating modes of at least the renewable energy generating systems and considering the interaction between the plural energy systems including the interaction between the at least one energy storage system and the plural renewable energy generating systems, wherein an operating scheme defining said operating modes for the renewable energy generating systems is selected based on the modeling that maximizes at least one of energy production of the power plant in a predetermined second future period of time, a power demand satisfaction for a power demand of the power grid in a predetermined second future period of time, or revenue generated by delivery of electrical energy produced by the power plant to the power grid in a predetermined second future period of time; and based on the selected operating scheme, adjusting the operation of the power plant.

2. The method according to claim 1, wherein the plural energy systems comprise at least one hydrogen production system configured to produce hydrogen from electrical energy.

3. The method according to claim 1, wherein the modeling for said future period of time considers storing energy generated by said renewable energy generating systems in the at least one energy storage system during some sections of the future period of time and retrieving stored energy from the energy storage system during other sections of the future period of time.

4. The method according to claim 1, wherein the renewable energy generating systems comprise at least two types of renewable energy generating systems selected from the group comprising or consisting of:
wind turbines; and
solar energy systems.

5. The method according to claim 1, wherein obtaining estimated environmental data comprises the obtaining of:
an estimated or predicted wind distribution;
an estimated or predicted solar radiation;
an estimated or predicted power demand present on the power grid; and/or
an estimated electricity price for electrical energy supplied to the power grid.

6. The method according to claim 1, wherein if the modeled residual lifetime of one of the plural renewable energy generating systems expires during the modeling for the future period of time, an energy production and/or a revenue generated by such renewable energy generating system is set to zero for the remaining modeling.

7. The method according to claim 1, wherein at least each of said at least one type of renewable energy generating systems is operable in one of plural different operating modes, wherein the different operating modes differ by a different activation state of one or more operating features and/or a different setting of one or more operating parameters,
wherein said modeling is performed as part of an optimization method for determining said operating scheme as an optimized operating scheme for the operation of the power plant,
wherein the operating scheme defines an operating mode at least for each of the type of renewable energy generating systems, wherein performing the optimization method comprises:
performing said modeling for one or more candidate operating schemes, wherein each candidate operating scheme defines a different combination of operating modes, wherein the modeling is based on the operating modes of the respective candidate operating scheme, and
based on the modeling, selecting one of the modeled candidate operating schemes as the optimized operating scheme, the selection being made in accordance with at least one optimization criterion;
wherein adjusting the operation of the power plant is performed by operating the power plant in accordance with the selected optimized operating scheme, and wherein the at least one optimization criterion comprises at least one of said energy production of the power plant in the predetermined second future period of time, said power demand satisfaction for a power demand of the power grid in the predetermined second future period of time, or said revenue generated by delivery of electrical energy produced by the power plant to the power grid in the predetermined second future period of time.

8. The method according to claim 7, wherein the optimization criterion further includes:
maximization of residual lifetime of at least one type of said renewable energy generating systems; and/or
minimization of a deviation of the modeled residual lifetime from a target lifetime for at least one type of said renewable energy generating systems.

9. The method according to claim 7, wherein the operating scheme further defines an operating mode for the at least one energy storage system, wherein the operating mode for the energy storage system defines at least one of the following operating features and/or operating parameters:
a current level or current level limit for electrical current provided or received by the energy storage system;
a cycle width of a charging/de-charging cycle for the energy storage system; and/or
a reference for a charging state of the energy storage system.

10. The method according to claim 1, wherein the operating scheme specifies for at least one operating feature of a renewable energy generating system a condition for the activation and deactivation of one or more operating features, wherein the condition is related to at least one of power demand of the power grid or electricity price for electrical energy delivered to the power grid.

11. The method according to claim 1, wherein the plural renewable energy generating systems of the one type comprise plural wind turbines, wherein the operating mode for a wind turbine defines at least an activation state of one of the following operating features:
an adaptive control system, ACS, control feature that reduces the output power of the wind turbine if turbulences above a threshold are determined at the wind turbine;
a power boost, PB, control feature that increases the power output of the wind turbine by increasing the power limit of the wind turbine under predetermined wind conditions;
a high wind ride through, HWRT, control feature that performs a load based reduction of the output power of the wind turbine at predetermined wind conditions;
a power curve upgrade kit, PCUK, control feature that modifies a control function of a wind turbine controller, in dependence on hardware modifications installed on the wind turbine; and/or
a peak shaving feature that changes the operating curve using which a wind turbine controller operates the wind turbine, the operating curve determining wind turbine settings, in dependence on wind speed.

12. The method according to claim 1, wherein the renewable energy generating systems comprise at least one or more solar systems, wherein the operating mode for a solar system defines at least one of the following operating features and/or operating parameters:
a current level or current level limit for electrical current provided by the solar system;
a control parameter related to a tracking mechanism of the solar system;
a control parameter related to a form of energy conversion performed by the solar system;
and/or
a control parameter related to an electrical power conversion performed by the solar system.

13. The method according to claim 1, wherein the plural renewable energy generating systems of the one type comprise plural wind turbines, wherein the one or more operating modes comprise one or more common operating modes for the plural wind turbines selected from the group comprising:

a wake adapt common operating mode, in which operation of the wind turbines is adapted on a wind farm level by turning the wind turbines out of the wind by a controllable angle to control wake losses of downstream wind turbines; and an active yaw control common operating mode, in which the rotors of the wind turbines are turned into plural pre-defined positions using the yaw drive to monitor power output at these different positions and to determine a yaw position for operation of the wind turbines.

14. A control system comprising a processing unit and a memory coupled to the processing unit, the memory storing control instructions which when executed by the processing unit perform the method of claim 1.

15. A computer program product, comprising a computer readable hardware storage device having computer readable program code stored therein, said program code executable by a processor of a computer system to implement the method of claim 1.

* * * * *